United States Patent [19]

Jatana

[11] Patent Number: 4,541,410
[45] Date of Patent: Sep. 17, 1985

[54] APPARATUS AND METHOD FOR BURNING A COMBUSTIBLE GAS, AND A HEAT EXCHANGER FOR USE IN THIS APPARATUS

[75] Inventor: Subhash C. Jatana, Upper Arlington, Ohio

[73] Assignee: Columbia Gas System Service Corporation, Columbus, Ohio

[21] Appl. No.: 515,642

[22] Filed: Jul. 20, 1983

[51] Int. Cl.$^4$ ............................................. F24H 1/00
[52] U.S. Cl. ................... 126/362; 122/182 S; 122/20 B; 122/17; 122/121; 126/361; 126/360 R
[58] Field of Search ............... 126/362, 364, 365, 345, 126/360 R, 350 R; 122/17, 182 R, 182 S, 156, 161, 180, 121, 122, 20 A, 20 B; 165/DIG. 2, DIG. 12, 163; 431/329, 328, 326; 237/57, 59, 62, 17

[56] References Cited

U.S. PATENT DOCUMENTS

| | | | |
|---|---|---|---|
| 410,620 | 9/1889 | Ward | 126/391 |
| 1,107,534 | 8/1914 | Lovekin | 122/20 B |
| 2,048,242 | 7/1936 | Yates | 122/20 B |
| 2,250,892 | 7/1941 | Mazer | 53/9 |
| 2,787,318 | 4/1957 | Wolfersperger | 122/182 R |
| 3,212,493 | 10/1965 | Lacey | 126/360 |
| 3,500,817 | 3/1970 | Read | 126/350 |
| 3,802,397 | 4/1974 | Wariner | 122/136 |
| 4,018,216 | 4/1977 | Thurley | 126/366 |
| 4,175,518 | 11/1979 | Reames, Jr. | 122/20 B |
| 4,178,907 | 12/1979 | Sweat, Jr. | 126/101 |
| 4,227,647 | 10/1980 | Eriksson | 122/20 B X |
| 4,371,111 | 2/1983 | Pernosky | 237/8 R |
| 4,398,502 | 8/1983 | Park | 126/364 X |
| 4,415,119 | 11/1983 | Borking et al. | 237/19 |
| 4,449,484 | 5/1984 | Sakamoto et al. | 126/361 X |

FOREIGN PATENT DOCUMENTS 2442408  7/1980  France ................................. 126/364

OTHER PUBLICATIONS

Boston Gas Products, Inc., "HeatMaker", A New Way to Heat Your Home and Water.

*Primary Examiner*—Randall L. Green
*Attorney, Agent, or Firm*—Sidney W. Millard

[57] ABSTRACT

An apparatus is described capable of functioning as a high-efficiency water heater. This apparatus passes a combustible mixture of gas and air from an impeller into the hollow interior of a cylindrical gas burner. The combustible mixture flows out through apertures in the cylindrical walls of the gas burner and is burned on a cylindrical flame as it emerges from the gas burner; the size of the apertures prevents flash-back of the flames of the combustible mixture into the gas burner. Heat is transferred from the flame to the walls of a cylindrical combustion chamber surrounding the gas burner and the combustion products generated pass to a heat exchanger comprising a vertical riser and a downwardly extending helical section which ensures maximum heat transfer to liquid in the tank surround the combustion chamber and heat exchanger. The apparatus may be used solely as a water heater or may serve as a combined gas furnace and water heating system.

15 Claims, 1 Drawing Figure

APPARATUS AND METHOD FOR BURNING A COMBUSTIBLE GAS, AND A HEAT EXCHANGER FOR USE IN THIS APPARATUS

BACKGROUND OF THE INVENTION

This invention relates to an apparatus and method for burning a combustible gas and passing the gaseous products to a heat exchanger for effecting heat exchange between a hot gas and a liquid.

Because of the rapidly rising cost of natural gas, in recent years much effort has been directed to improving the efficiency of gas furnaces for residential and other consumers. Most modern gas furnaces use electronic ignition rather than a pilot light to avoid the inevitable waste of gas which a pilot light involves. Also, very high efficiency gas furnaces have been introduced; some of these furnaces use a pulse system in which pulses of a gas and air mixture are ignited within a combustion chamber, while others rely upon relatively complicated heat exchangers to extract the maximum amount of heat from the combustion products produced by burning natural gas. The latest furnaces are considerably more efficient than the older, pilot ignition gas furnaces; a typical pilot ignition gas furnace might have a steady state efficiency of about 75% and a seasonal efficiency of about 65%, while replacing the pilot light with either direct spark ignition or intermittent pilot ignition increases the seasonal efficiency to about 70%. Certain of the high-efficiency gas furnaces previously mentioned have seasonal efficiencies of about 80–90%.

Although much attention has thus been directed to improving the efficiency of gas furnaces, many residential gas consumers have both a gas furnace for space heating and a gas water heater, and relatively little research appears to have been performed to improve the efficiency of gas water heaters. The design of residential gas water heaters has changed relatively little over the last few years. Most residential gas water heaters comprise a cylindrical water tank provided with an insulating jacket and a gas burner which impinges upon the base of the water tank; to allow escape of combustion products produced by the burning gas, a vertical conduit carrying the exhaust products extends vertically upwardly along the axis of the cylindrical tank, this vertical conduit serving to effect additional heat exchange between the combustion products and the water in the tank. The steady state and seasonal efficiencies of such gas water heaters are only about 70% and 55% respectively, considerably lower than those of the high-efficiency types of gas furnaces previously described. Thus, the overall efficiency of gas consumption by most consumers is markedly diminished by the relative inefficiency of conventional gas water heaters. In fact, when appropriate weighting is given to the relative amounts of gas used by the furnace and water heater in a typical household, the combined seasonal efficiency of gas usage is only about 66%. There is thus a need to improve the efficiency of gas water heaters in order to increase the overall efficiency of gas use.

The use of separate furnace and water heating units has other disadvantages in addition to the relatively low overall efficiency of gas use. The separate furnace and water heater require a relatively large amount of space and also require two separate pilot lights or other ignition systems, and separate gas lines, thus increasing installation costs.

In order to overcome the aforementioned disadvantages of gas furnaces and gas water heating units, it is desirable to provide a single unit which functions both as a gas furnace for space heating and as a gas water heater. This invention provides an apparatus which can function both as a gas furnace and as a gas water heater and also provides a method for burning a combustible gas which enables such a combined gas furnace and water heater to achieve great efficiency. Finally, this invention provides a heat exchanger effecting heat exchange between a hot gas and a liquid which can be used in the aforementioned gas furnace and water heater.

SUMMARY OF THE INVENTION

This invention provides apparatus for burning a combustible gas comprising a housing having walls defining a liquid chamber capable of holding liquid and a combustion chamber member disposed within the liquid chamber and having liquid-impervious walls defining a combustion chamber. Within the combustion chamber is disposed a gas burner having walls defining an internal chamber and apertures passing through these walls, thus establishing fluid communication between the internal chamber of the gas burner and the combustion chamber outside the gas burner. Finally, the apparatus comprises an impeller for passing a combustible mixture of the combustible gas and an oxygen-containing gas under pressure into the internal chamber of the gas burner. The apertures in the gas burner are so sized that combustion of the combustible mixture within the combustion chamber outside the gas burner will not cause ignition of the combustible mixture within this internal chamber.

The invention also provides a method for burning a combustible gas comprising mixing the combustible gas with an oxygen-containing gas to form a combustible mixture capable of supporting combustion without addition of any further oxygen-containing gas, passing this combustible mixture under pressure into an internal chamber of a gas burner, this gas burner having walls defining the internal chamber and apertures passing through these walls, these apertures being so sized that combustion of the combustible mixture outside the gas burner will not cause ignition of the combustible mixture within the internal chamber of the gas burner, permitting the combustible mixture to pass through these apertures, and burning the combustible mixture as it leaves the apertures.

Finally, the invention provides a heat exchanger for effecting heat exchange between a hot gas and a liquid, this heat exchanger comprising a housing having walls defining a liquid chamber capable of holding liquid and a gas conduit disposed within the liquid chamber. The gas conduit comprises a riser section capable of being connected to a source of hot gas and extending upwardly therefrom, and a substantially helical section extending downwardly from the upper end of the riser section.

BRIEF DESCRIPTION OF THE DRAWINGS

The accompanying drawing shows a vertical section through an apparatus of the invention.

DETAILED DESCRIPTION OF THE INVENTION

Figure 1:
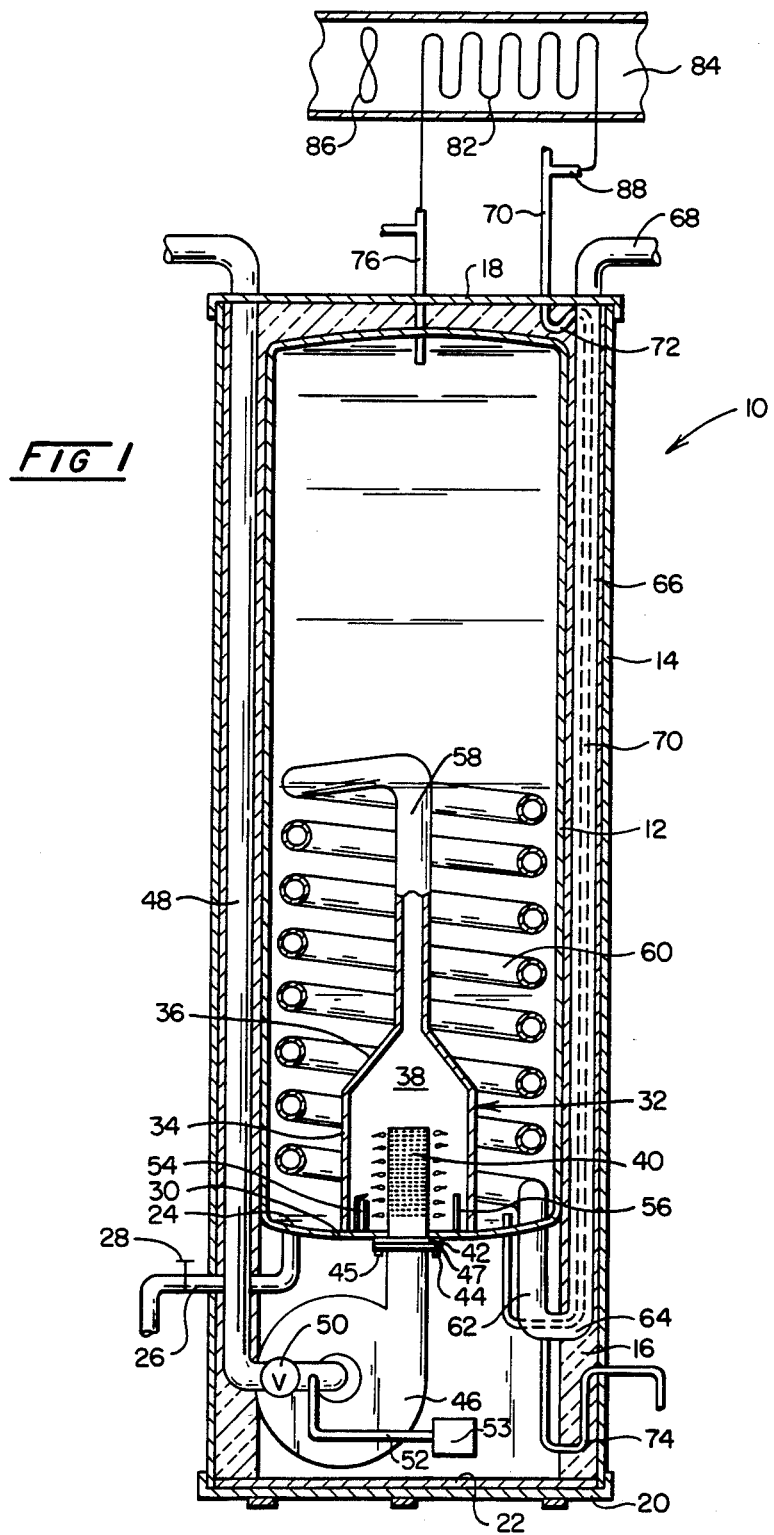

The instant apparatus for burning combustible gas differs from conventional gas furnaces in the manner in which the combustible gas and oxygen-containing gas (usually, of course, air) are mixed. (In the following description, the instant method and apparatus will normally be described assuming that the oxygen-containing gas is air; if for any reason it is desired to use a different oxygen-containing gas, references to such gas may of course be substituted for references to air.) In conventional gas furnaces pure gas flows out of one or more gas nozzles, thereby becoming mixed with air to form a combustible mixture which burns immediately adjacent the gas nozzle. In the operation of the instant apparatus and in the instant method, the combustible gas and the air are pre-mixed to form a combustible mixture which is then forced into the internal chamber of the gas burner (in saying that, in the instant method, the combustible is passed "under pressure" into the internal chamber of the gas burner, I mean only that the combustible mixture enters this internal chamber at a pressure greater than the pressure existing immediately outside the gas burner, so that the combustible mixture will flow out of the gas burner via the apertures therein). The apertures in the gas burner are sized so that combustion of the gas around the gas burner will not cause ignition of the combustible mixture within the gas burner thus, preventing the occurence of any flashback and/or explosion within the burner or impeller. The pre-mixing of gas and air achieved in my apparatus and method enables the gas/air ratio to be precisely controlled, in contrast to a conventional furnace in which, because only combustible gas flows from the nozzle, only limited control can be exercised over the gas/air ratio. Control of the gas/air ratio is important in achieving maximum efficiency of gas usage, since an excess of air over that required for combustion of the gas simply dilutes the combustion products, reducing the temperature thereof and thus reducing the efficiency of heat exchange between the combustion products and any heat exchanger which serves to remove heat from the combustion products and supply it to where it is needed. Those skilled in the art are aware that conventional gas furnaces and water heaters draw past the gas nozzles considerably more air than is required for proper combustion of the gas, but hitherto it has not been possible to exercise effective control over the gas/air ratio in order to avoid dilution of the combustion products by excess air, and this is one of the factors which reduces the efficiency of conventional gas furnaces and water heaters. While I do not absolutely exclude the possibility that the design of the combustion chamber in my apparatus may allow for the entry of some additional air thereinto, in addition to the combustible mixture issuing from the gas burner, I very much prefer that the combustion chamber have no gas inlet other than the gas burner so that all the air required for combustion is mixed with the combustible gas prior to its entry into the gas burner.

As already mentioned, in the instant apparatus the impeller forces a mixture of combustible gas and air into the gas burner. The admixing of the combustible gas and air may be effected either upstream or downstream of the impeller; i.e. the combustible gas may be admixed with air upstream of the impeller and the resultant mixture passed through the impeller, or alternatively only air may pass through the impeller and admixing of the air with the combustible gas be effected between the impeller and the gas burner. In the former case it is of course essential that the impeller be of a type which will not generate sparks or the like capable of igniting the combustible mixture of gas and air passing through it; in the latter case, no such restriction on the type of impeller exists.

In theory the amount of air mixed with the combustible gas before entry into the gas burner should be equal to the theoretical amount required for complete combustion of the combustible gas. However, in practice it is desirable to provide a small excess of air in order to allow for transient fluctuations in the gas/air ratio due to fluctuations in gas pressure and the like. Thus, the amount of air or other oxygen-containing gas mixed with the combustible gas to form the combustible mixture is desirably from 1 to about 1.2, and preferably about 1.1, times the amount of air or other oxygen-containing gas stoichiometrically required for complete combustion of the combustible gas. I have also discovered that the geometric shape of the gas burner is important in the instant apparatus and method. Very desirably, the combustion and the gas burner of my apparatus have substantially the form of a pair of co-axial cylinders and the apertures in the gas burner are disposed in the cylindrical wall of the gas burner, thereby permitting combustion of the combustible mixture on a cylindrical flame front surrounding the gas burner. This cylindrical flame front allows for very good heat transmission from the flame to the cylindrical wall of the combustion chamber which, when the apparatus is in use, is immersed in liquid held in the liquid chamber, and thus promotes very efficient heat transfer from the flame to the liquid. Where the cylindrical burner has an end wall, this end wall may or may not be provided with apertures i.e. the cylindrical burner may have apertures in the side walls only or in both the side walls and the end wall. Other shapes of gas burner may also be employed; for example, the burner may be conical, frusto-conical or hemispherical or have the form of a hemisphere truncated by a plane parallel to its base. To ensure good heat transfer to the walls of the combustion chamber, desirably the combustion chamber has substantially the same form as the burner. However, it has been found that a cylindrical gas burner having apertures only in the side walls is the most efficient form. It will be appreciated, of course, that the cylindrical flame front which can be achieved in the instant apparatus using a cylindrical gas burner cannot be achieved by a conventional gas burner in which pure combustible gas issues from the nozzle, since the flame front produced by such a gas burner is always substantially conical.

The presently preferred embodiment of my apparatus will now be described, though by way of illustration only, with reference to the accompanying drawing. This drawing shows an instant apparatus (generally designated 10) which comprises a substantially cylindrical housing or water tank or liquid chamber 12 generally similar to the tank of a conventional water heater except that it lacks the normal central, vertical exhaust conduit. As in a conventional gas water heater, the tank 12 is surrounded by an outer housing or cylinder 14 and an annular insulating jacket 16 is disposed between the tank 12 and the outer cylinder 14 to reduce heat loss from the tank 12. The upper end of the outer cylinder 14 is closed by an end plate 18; the insulating jacket 16 also fills the space between the end plate 18 and the adjacent upper end wall of the tank 12 in order to reduce heat loss from the end wall of the tank 12. The lower end of the outer cylinder 14 extends downwardly beyond the lower end of the tank 12 and is closed by a base plate 20 which rests upon a floor or other suitable support surface and thus supports the entire apparatus. A pad 22 of the same insulating material as the jacket 16 is disposed above the base plate 20 to reduce heat loss via the baseplate.

The lower end wall 24 of the tank 12 has fixed thereto a drain tube 26 provided with a manually-operable valve 28 which is normally closed but which can be opened when it is desired to drain liquid from the tank 12. When the apparatus is in normal operation, the tank 12 is completely filled with water. The central portion of the lower-end wall 24 is flat and has a central circular aperture cut therein. This circular aperture surrounded by a planar flange 30 which forms part of the lower-end wall of a combustion chamber member 32. This combustion chamber member 32, lies wholly within the tank 12, is cylindro-conical in form having the circular plate 30 as part of its base, a cylindrical side wall section 34 extending upwardly from around the periphery of the plate 30 and an upper frusto-conical section 36 connected to the upper end of the cylindrical section 34. The various sections of the combustion chamber member 32 enclose a cylindro-conical combustion chamber 38. Within this combustion chamber 38 is a gas burner 40 having the form of a hollow cylinder closed at its upper end but open at its lower end. The gas burner 40 extends downwardly through the central circular aperture in the lower-end wall 24 and has a flange 42 extending radially outwardly below the flange 30. The cylindrical wall of the gas burner 40 has a multitude of small apertures passing therethrough, thereby establishing fluid communication between the internal chamber within the hollow cylindrical gas burner 40 and the combustion chamber 38 lying outside the gas burner 40.

When the apparatus is in operation a combustible mixture of natural gas and air is fed under pressure to the internal chamber of the gas burner 40 from an impeller 46 located between the lower end wall 24 of the tank 12 and baseplate 20. To secure a gas-tight connection between the impeller 46 and the interior of the gas burner 40, the impeller 46 is provided, at its outlet end, with a flange 47 for attachment to flange 42 on the gas burner 40. The flange 30 is provided with four equally-spaced threaded studs 44 which extend downwardly through bores (not shown) provided in the flanges 42 and 47 on the gas burner 40 and the impeller 46. Nuts 45 are screwed on to the lower ends of the studs 44, thereby securing the flanges 30, 42 and 47 together and establishing a gas-tight connection between the impeller 46 and the interior of the gas burner 40. Gaskets (not shown) may of course be provided between adjacent pairs of the flanges 30, 42 and 47 to assist in obtaining good seals.

The impeller 46 may be of any convenient type and could be, for example, a vane pump or a fan. Since, as described in more detail below, the impeller 46 is required to pump a combustible mixture of natural gas and air, the impeller must in practice be of a type which can pump such combustible gas without any risk of explosion, but it is believed that those skilled in the art will have no difficulty in providing an impeller which meets these requirements. (Alternatively, if mixing of the natural gas and air is arranged to take place downstream of the impeller, the impeller need not be of any specific type). The impeller 46 is driven by an electric motor (not shown).

The impeller 46 draws its air from an air-inlet tube 48. The inlet end (not shown) of this tube 48 is preferably located externally of the building in which the apparatus is installed in order that the air drawn into the impeller will be unconditioned, external air and not air which is already conditioned. The portion of the tube 48 adjacent the main part of the apparatus 10 comprising a horizontal limb which terminates above the upper endplate 18, a vertical limb which extends vertically downwardly between the cylindrical walls of the tank 12 and the outer cylinder 14 within the insulating jacket 16, and a second horizontal limb which extends to the intake of the impeller 46. (The shape of the tube 48 is of course dictated solely by the type and position of air intake port with which the apparatus 10 is intended to be used and may vary almost indefinitely. Indeed, in principle tube 48 could terminate flush with the upper surface of the endplate 18 but such an arrangement would have the obvious disadvantage of drawing combustion air from within the building rather than using unheated outside air. Also, the tube 48 could be replaced by a simple horizontal tube extending outwardly from the impeller 46 i.e. by a horizontal tube which is in effect an extension of the second horizontal limb shown.) This placement of the tube 48 is designed so that none of the tube 48, which is made of polyvinyl chloride, protrudes from the cylindrical wall of the outer cylinder 14, since any protruding parts of the tube would be susceptible to damage during transit (if in place during such transit), or damage after installation caused by, for example, children, houshold pets, or careless handymen. A manually-operable butterfly valve 50 may be disposed in the second horizontal limb of the tube 48 (but may alternatively be disposed in the vertical limb of the tube 48); this valve permits adjustment of the natural gas/air ratio in the mixture provided by the impeller 46 to the gas burner 40 and is accessible via a removable panel (not shown) in the outer cylinder 14; naturally, a corresponding aperture is provided in the insulating jacket 16 adjacent this removable panel. The placement of the valve 50 is designed to permit ready adjustment of the valve 50 by the person installing the apparatus but to render later access by other persons difficult in order to ensure, as far as possible, that untrained persons do not attempt to adjust this valve setting, since improper adjustment could result in incomplete combustion of the natural gas or other undesirable consequences. Natural gas is supplied to the impeller via a gas line 52 provided with a gas valve 53; the line 52 intersects the second horizontal limb of the tube 48 immediately adjacent the inlet of the impeller 46.

Besides the gas burner 40, the combustion chamber 38 contains an electrical ignition device 54 which can be of any conventional type and which is used in the conventional manner to ignite the combustible gas/air mixture emerging from the gas burner 40, and a flame sensor 56 which is also of a conventional type and which serves to check that the gas/air mixture emerging from the gas burner 40 has been correctly ignited by the ignition device 54. The purpose of the flame sensor 56 will be described in more detail below. (The electrical ignition device 54 and the flame sensor 56 may alternatively be combined into a single device which performs both functions).

The combustion products produced by burning of the gas/air mixture within the combustion chamber 38 pass through a heat exchanger comprising a riser section 58 which is connected to the upper end of, and extends vertically upwardly from, the frusto-conical section 36 of the combustion chamber member, and a helical section 60, which extends downwardly from the upper end of the riser section 58. The riser section 58 lies along the axis of the tank 12 and the axis of the helical section 60 coincides with the axis of the tank 12. It has been found that this form of heat exchanger provides a very efficient heat transfer from the combustion products to water in the tank 12, because the downward slope of the helical section 60 contributes to a higher coefficient of convective heat transfer (since the coolest downstream section of the heat exchanger is in contact with the coolest water adjacent the base of the tank 12) and therefore to higher efficiency of the heat exchanger. It should be noted that the lower end of the helical section 60 lies adjacent the base 24 of the tank 12; since water heated by the heat exchanger tends to rise within the tank 12, it is desirable that the lower end of the heat exchanger extend adjacent the base of the tank 12 in order to ensure that a large mass of cold water is not left below the heat exchanger and remains unheated thereby. The combustion products leaving the lower end of the helical section of the heat exchanger pass through an exhaust conduit having a first vertical section 62 extending vertically downwardly from the lower end of the heat exchanger 60 through the base 24 of the tank 12, a short horizontal section 64 which extends into the insulating blanket 16, and a second, long vertical section 66 which extends vertically upwardly from the horizontal section 64 through the insulating blanket 16 and through an aperture provided in the upper end plate 18. From the upper end of the second vertical section 66, a horizontal section 68 carries the combustion products out of the building in which the apparatus is installed. (The form of the section 68 may vary for the reasons already stated in relation to the corresponding section of the inlet tube 48, and similarly the vertical section 66 and/or horizontal section 68 may be omitted entirely.) The placement of the second vertical section 66 within the insulating blanket 16 serves to prevent accidental damage to the second vertical section, as already described in relation to the air inlet tube 48.

A water supply line 70 used to supply water to the tank 12 passes through an aperture provided in the upper endplate 18 and then passes vertically downwardly within the second vertical section 66 of the exhaust conduit, along the first horizontal section 64 of this conduit and then vertically upwardly through an aperture provided in the base 24 of the tank 12 into the interior of that tank. The disposition of the water supply line 70 within the sections 66 and 64 of the exhaust conduit allows heat exchange to take place between the combustion products passing along the exhaust conduit and the water entering the tank via the water supply line, thus pre-warming the water entering the tank 12 and further cooling the combustion products, thereby increasing the efficiency of the apparatus. At the point where it enters the exhaust conduit, the water supply line is provided an U-bend 72; this U-bend reduces the tendency for water warmed by heat transfer from the combustion products passing along the exhaust conduit from rising into the portion of the water supply line 70 lying above the upper endplate 18. Such back-flow of water into the part of the water supply line 70 lying above the plate 18 is obviously undesirable since it leads to heat loss from the apparatus, thus reducing the efficiency thereof. In addition, the resultant leakage of hot water into the cold water system may produce undesirable changes in temperature therein.

The cooling of the combustion products which occurs in the heat exchanger 58, 60 by heat transfer to water in the tank 12, and in the exhaust conduit by heat transfer to the water in the water supply line 70, causes condensation of liquid from the combustion products, and the resultant condensate passes into the first horizontal section 64. Thus the U-shape formed by the sections 62, 64 and 66 serves as a condensate trap. A drain conduit 74 extends downwardly from the first horizontal section 64 and serves to drain condensate therefrom. The drain conduit 74 is provided with a U-bend below the first horizontal section 64; this U-bend rapidly becomes filled with condensate when the apparatus is in operation, and the condensate filling the lowest part of the U-bend acts as a liquid seal to prevent gaseous combustion products flowing out through the drain conduit 74. The outlet end (not shown) of the drain conduit 74 is connected to a suitable drain line.

As already mentioned, the apparatus 10 serves as both a water heater and a space heater or furnace. A water outlet line 76 extends from within the tank 12 through the upper end wall of the tank and through the upper endplate 18. This water outlet tube 76 serves to supply hot water for domestic use, as indicated schematically by a branch. Another branch line leaves the water output line 76 a short distance above the upper endplate 18 and serves to supply hot water from the tank 12 to a space heating assembly comprising a coil 82 disposed within a duct 84, which forms part of the ductwork of a conventional forced-air domestic space heating system. Air is forced over the coil 82 by means of a thermostatically-controlled fan 86 (shown only schematically). Water from the coil 82 is returned to the tank via a return line 88, which intersects the water supply 70 a short distance above the upper endplate 18. As will be apparent to those skilled in the art, the apparatus 10 can also be used in conjunction with a baseboard radiator or other type of hot water space heating system.

The dimensions of the various parts of the apparatus 10 can of course vary considerably depending upon various factors, and in particular upon the desired thermal output of the apparatus. However, a typical 100,000 Btu/hr. (25,200 KCal/hr.) apparatus for domestic use may have a tank 12 having a capacity of about 40 gallons (151 liters) and approximately 16 inches (45 cm.) in diameter. In steady state operation, such a unit would use 100 cubic ft. (2.83 m$^3$) of gas per hour and approximately 11,000 cubic ft. (31.1 m$^3$) of air per hour, assuming that the amount of air is set at the optimum value of approximately 10% above that stoichiometrically required for combustion of the gas. This gas/air mixture will be forced by the impeller 46 at a pressure of approximately 4 inches (10 cm.) water gauge pressure into the internal chamber of the gas burner 40; it should be noted that this operating pressure is considerably greater than that employed in supplying air to most gas furnaces since the resistance to flow provided by the apertures in the gas burner and by the heat exchanger 58, 60 requires a considerably greater operating pressure. The cylindrical portion of the gas burner 40 has a length of approximately 4 inches (10 cm.) and a diameter of approximately 2.2 inches (5.5 cm.). The uppermost 3 inches (7.5 cm.) of the cylindrical wall of the gas burner 14 is pierced by apertures having a diameter of 0.033–0.036 inches (0.84–0.91 mm.) (though the apertures could vary within the range of 0.020–0.062 inches (0.50–1.57 mm.) if desired) spaced on a square grid at intervals of approximately 0.070 inches (1.78 mm.); the lines within this grid run parallel to the axis of the cylindrical gas burner 40 and on circles running around the gas burner. The helical section 60 of the heat exchanger is formed of a stainless steel tube of diameter not greater than 2 inches (5 cm.) and has a total length of approximately 30 ft. (9.1 m.).

It has been found that a 100,000 Btu/hr. unit constructed having the foregoing dimensions has a steady-state efficiency in excess of 95% and experiments indicate that the seasonal efficiency or service efficiency of the apparatus will be about 90%. Due to the simplicity of the design, the apparatus is significantly less expensive to construct than other high efficiency gas furnaces and gas water heating systems presently available, being comparable to the total installed cost of a conventional gas furnace and gas water heater. The combustion products leaving the apparatus have a low nitrogen oxide content, probably due to the near stoichiometric combustion conditions within the combustion chamber 38 made possible by the control of the gas/air ratio which the apparatus provides. The apparatus does not need a chimney or a class A or B vent; the outlet from the exhaust conduit may be discharged through corrosion resistant tubing through any convenient external surface of the building in which the apparatus is installed. It should be noted that the combined steady-state efficiency of water and space heating of about 95% is greater than that of any combined system available.

It will of course be appreciated that if desired the heating coil 82, the duct 84 and the fan 86 could be replaced by one or more conventional water-filled radiators for space heating purposes, a forced-air system being shown in the drawing simply because this is the most common type of system used in domestic space heating. Obviously, if water-filled radiators are to be used in space heating, it will be necessary to provide the water outlet line 76 or the return line 88 with a circulating pump to effect circulation of water through the radiators. (In practice, although not shown in the accompanying drawing, a circulating pump will in practice usually be necessary in forced-air systems also).

All the essential features of the apparatus 10 have already been described. However, in order to ensure the safest possible operation under domestic conditions, it is desirable that a number of safety devices be incorporated into the apparatus to cope with possible equipment failures and unusual operating conditions. As already mentioned, the flame sensor 56 is provided within the combustion chamber 38 to detect an absence of flame due either to failure of the ignition device 54 or to failure to supply proper quantities of gas because of improper operation of the impeller 46. When the flame sensor detects an absence of flame while the impeller 46 should be operating, the flame sensor 56 is arranged to close a switch (not shown) which shuts down the impeller 46. Also, the air inlet line 48 is provided with a pressure sensor (not shown) adjacent the inlet to the impeller 46. When the impeller is operating normally, significant suction exists in the air inlet conduit 48 and if inadequate suction exists in this line, the impeller is not operating correctly and accordingly the pressure sensor is arranged to shut the impeller down. The pressure sensor is also arranged to shut the impeller down if excessive suction exists in the line 48 as a result of, for example, obstruction of the air intake to this line by debris of other materials.

Those skilled in the art will appreciate that, although the specific embodiment of the invention described above is intended for use as a combined water/space heating system, the instant apparatus may also be useful as a high-efficiency water-heating system without space-heating capability, especially in commercial water heating systems.

It will be apparent to those skilled in the art that numerous changes and modifications can be made in the embodiments of the invention described above without departing from the scope of the invention. Accordingly, the foregoing description is to be construed in an illustrative and not in a limitative sense, the scope of the invention being defined solely by the appended claims.

I claim:

1. Apparatus for burning a combustible gas comprising:
   a housing having walls defining a liquid chamber capable of holding liquid;
   a cylindrical combustion chamber sealed except for a gas inlet and a frustoconical outlet for combustion products, said combustion chamber being disposed within said liquid chamber and having liquid-impervious walls;
   an exhaust conduit having an inlet connected to the small end of the frustoconical outlet of said combustion chamber and an exhaust outlet through which combustion products can leave said conduit, said conduit being of substantially uniform cross-section from its inlet to its exhaust outlet;
   a gas burner disposed within said combustion chamber and in fluid communication with said gas inlet, said gas burner having walls defining an internal chamber and apertures passing through said walls, thereby establishing fluid communication between said internal chamber of said gas burner and said combustion chamber outside said gas burner; and
   an impeller means for urging a combustible mixture of a combustible gas and air through said gas inlet into said internal chamber of said gas burner, means for controlling the ratio of gas and air in the range 1–1.2 times the amount of air to completely burn the gas,
   said apertures in said gas burner being sized such that combustion of said combustible mixture within said combustion chamber outside said gas burner will not cause ignition of said combustible mixture within said internal chamber of said gas burner,
   the housing being surrounded by an insulating jacket which in turn is surrounded by an outer housing,
   said exhaust conduit comprises a first heat exchanger for being immersed in liquid in said liquid chamber for effecting heat exchange between the combustion products produced by combustion of said combustible mixture and the liquid in said liquid chamber, said first heat exchanger being disposed within said liquid chamber and comprising a riser section extending upwardly from said small end of the frustoconical outlet and a helical section extending downwardly from said riser section to said exhaust outlet.

2. Apparatus according to claim 1 wherein said combustion chamber has no gas inlet other than said gas burner and no outlet other than said exhaust conduit.

3. Apparatus according to claim 1 wherein said combustion chamber and said gas burner have substantially the form of a pair of co-axial cylinders and wherein said apertures in said gas burner are disposed in the cylindrical wall of said gas burner thereby permitting combustion of said combustible mixture on a cylindrical flame front surrounding said gas burner.

4. Apparatus according to claim 1 wherein said housing has at least one sidewall and a base, said gas inlet is formed in said base, said combustion chamber and said gas burner having substantially the form of a pair of co-axial cylinders having substantially vertical axes and extending upwardly from said base, wherein a combustible mixture supply conduit passes from said impeller to said gas inlet through said base and communicates with said internal chamber of said gas burner, and wherein said apertures in said gas burner are disposed in the cylindrical wall thereof, thereby permitting combustion of said combustible mixture on a cylindrical flame front surrounding said gas burner.

5. Apparatus accoarding to claim 1 further comprising a condensate trap in said exhaust conduit for draining condensate produced by cooling of said combustion gases in said first heat exchanger, said condensate trap comprising a first conduit extending downwardly from the lower end of said helical section of said first heat exchanger, a second conduit extending upwardly from the lower end of said first conduit and terminating at said exhaust outlet, and a drain conduit extending downwardly from adjacent the junction of said first and second conduits, said drain conduit including a U-bend to trap condensed water and prevent the exit of combustion products through the drain conduit.

6. Apparatus according to claim 5 further comprising a liquid supply line for supplying liquid to said liquid chamber, a portion of said liquid supply line being disposed within said second conduit.

7. Apparatus according to claim 1 wherein said apertures in said gas burner are not more than about 0.062 inches in diameter.

8. The apparatus of claim 1 including means for withdrawing hot water from said housing and (1) conveying some of it to a second heat exchanger where heat is extracted from said hot water and (2) means are provided for discharging some of said hot water from the system.

9. The apparatus of claim 8 including means for returning water from the second heat exchanger to the housing.

10. Apparatus according to claim 9 wherein at least part of said exhaust conduit is disposed between said housing and said outer housing, and part of said water return means is disposed within said exhaust conduit.

11. The apparatus of claim 9 including means for supplying water to said housing, means for mixing the water supply with the water return from the second heat exchanger and passing the water mixture in countercurrent heat exchange relationship with said combustion products prior to the time the mixture is returned to the housing.

12. The apparatus of claim 1 wherein the impeller passes the mixture to the gas burner and in which said gas burner is about 10 cm. in length and about 5.5 cm. in diameter, the uppermost 7.5 cm. of the burner being pierced by apertures having a diameter in the range 0.5–1.57 mm. spaced on a square grid at intervals of about 1.78 mm.

13. The apparatus of claim 1 wherein the first heat exchanger is located in the lowermost part of the housing where the water is at its lowest temperature.

14. The apparatus of claim 13 including supplying cold water to said housing near the coldest water in said housing.

15. The apparatus of claim 1 wherein the combustible mixture is supplied to the burner at a pressure not substantially greater than 10 cm. of water.

* * * * *